United States Patent
Ao et al.

(10) Patent No.: US 9,118,516 B1
(45) Date of Patent: Aug. 25, 2015

(54) DIFFERENTIAL TRANSMISSION LINE WITH COMMON MODE NOTCH FILTER

(71) Applicant: LENOVO ENTERPRISE SOLUTIONS (SINGAPORE) PTE. LTD., New Tech Park (SG)

(72) Inventors: Eric R. Ao, Nepean (CA); Alexander P. Campbell, Kanata (CA); Donald R. Dignam, Ottawa (CA); Stephen J. Flint, Ottawa (CA); Jian Meng, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/473,636

(22) Filed: Aug. 29, 2014

(51) Int. Cl.
*H04B 3/50* (2006.01)
*H04L 25/02* (2006.01)

(52) U.S. Cl.
CPC ........ *H04L 25/0278* (2013.01); *H04L 25/0272* (2013.01); *H04L 25/0276* (2013.01)

(58) Field of Classification Search
CPC ........... H04L 25/0272; H04L 25/0278; H05K 1/0245
USPC .................................................. 375/257, 220
See application file for complete search history.

(56) References Cited

U.S. PATENT DOCUMENTS

| | | | |
|---|---|---|---|
| 4,609,892 A | 9/1986 | Higgins, Jr. | |
| 5,639,989 A | 6/1997 | Higgins, III | |
| 7,397,320 B1 | 7/2008 | Bokhari | |
| 7,705,690 B2 | 4/2010 | Lee | |
| 7,773,390 B2 | 8/2010 | Weir | |
| 7,886,431 B2 | 2/2011 | Weir | |
| 7,977,582 B2 | 7/2011 | Clark | |
| 8,339,212 B2 | 12/2012 | Wu | |
| 2004/0239438 A1* | 12/2004 | Benham et al. | 333/24 R |
| 2010/0212951 A1 | 8/2010 | Kim | |
| 2011/0030997 A1 | 2/2011 | Hsu | |
| 2011/0032048 A1* | 2/2011 | Wu et al. | 333/12 |
| 2011/0203834 A1 | 8/2011 | Yoneya | |
| 2012/0098627 A1* | 4/2012 | Kameya | 333/204 |

FOREIGN PATENT DOCUMENTS

| | | |
|---|---|---|
| CN | 102316670 | 1/2012 |
| JP | 200564976 | 3/2005 |
| JP | 2012099536 | 5/2012 |

OTHER PUBLICATIONS

"Use of EBG Void Shapes in Reference Planes to Suppress Common Mode Noise on Differential Signals", IBM, Aug. 26, 2009, 4 pp.

* cited by examiner

Primary Examiner — Kevin Kim
(74) Attorney, Agent, or Firm — Katherine Brown

(57) ABSTRACT

A differential transmission line with a common mode notch filter includes adjacently arranged, repeating differential transmission line pair sections. The sections have lengths that are each equal to half of an electric wavelength of a lowest frequency of a common mode electromagnetic wave to be suppressed during transmission of an electric signal over the differential transmission line. Each section includes a pair of conductors separated from one another by a spacing. The width of each conductor and the spacing between the conductors of each section vary over the length thereof according to a same pattern such that at every point over the length of each section a differential mode impedance of the differential transmission line is identical. A common mode impedance of the differential transmission line changes periodically in accordance with the lengths of the sections.

20 Claims, 5 Drawing Sheets

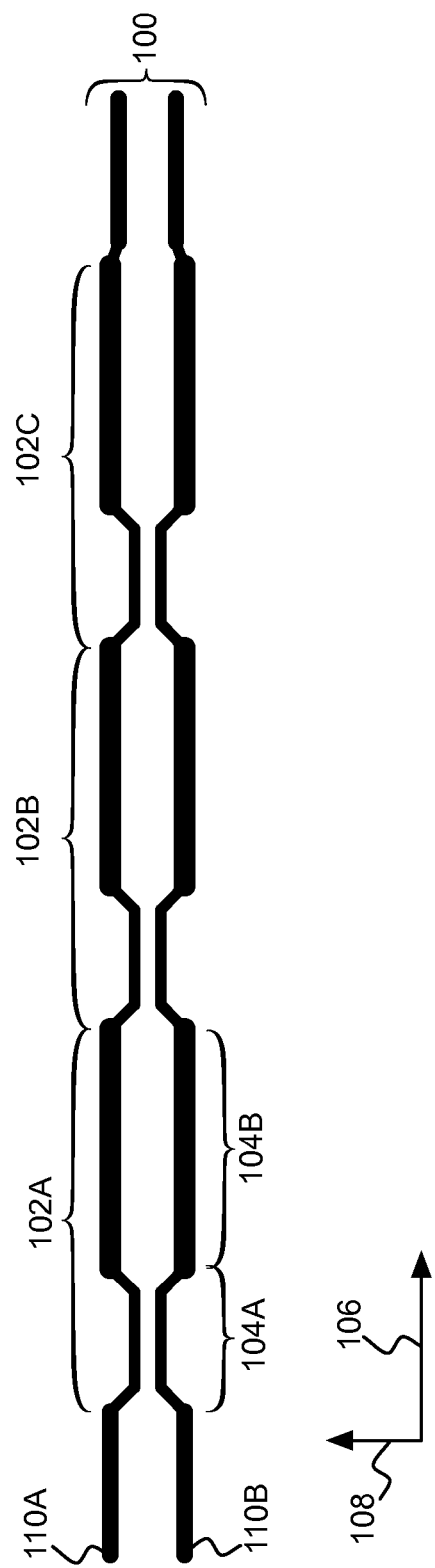

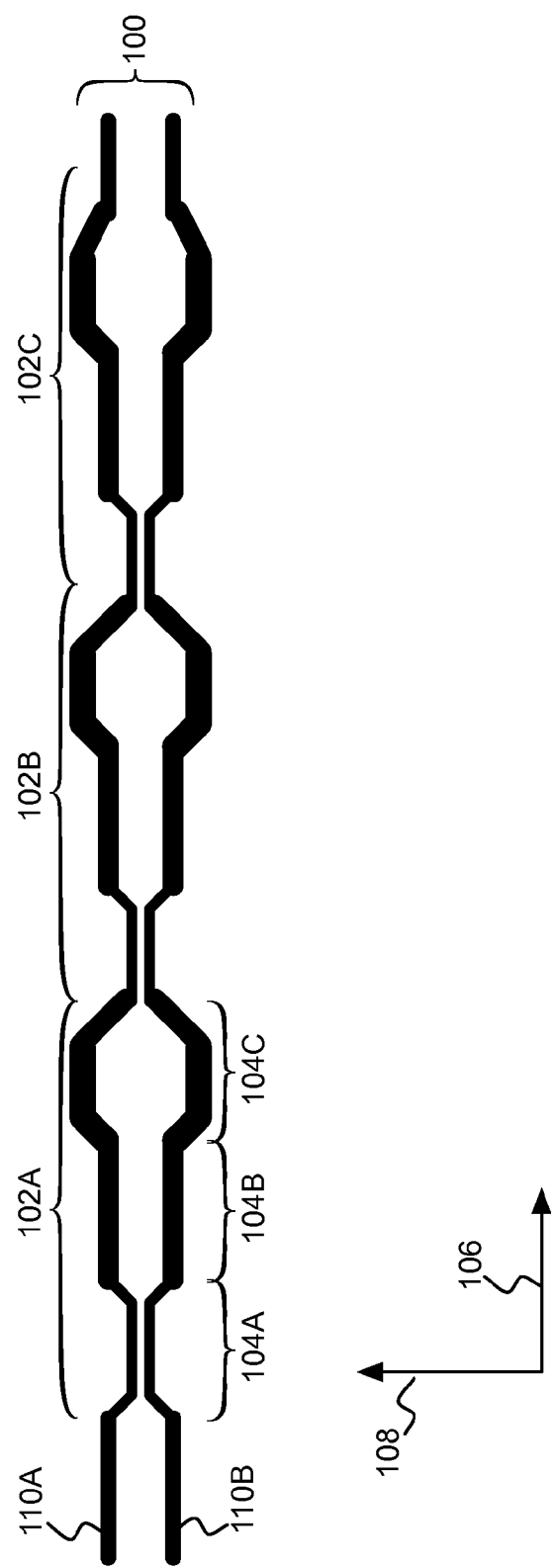

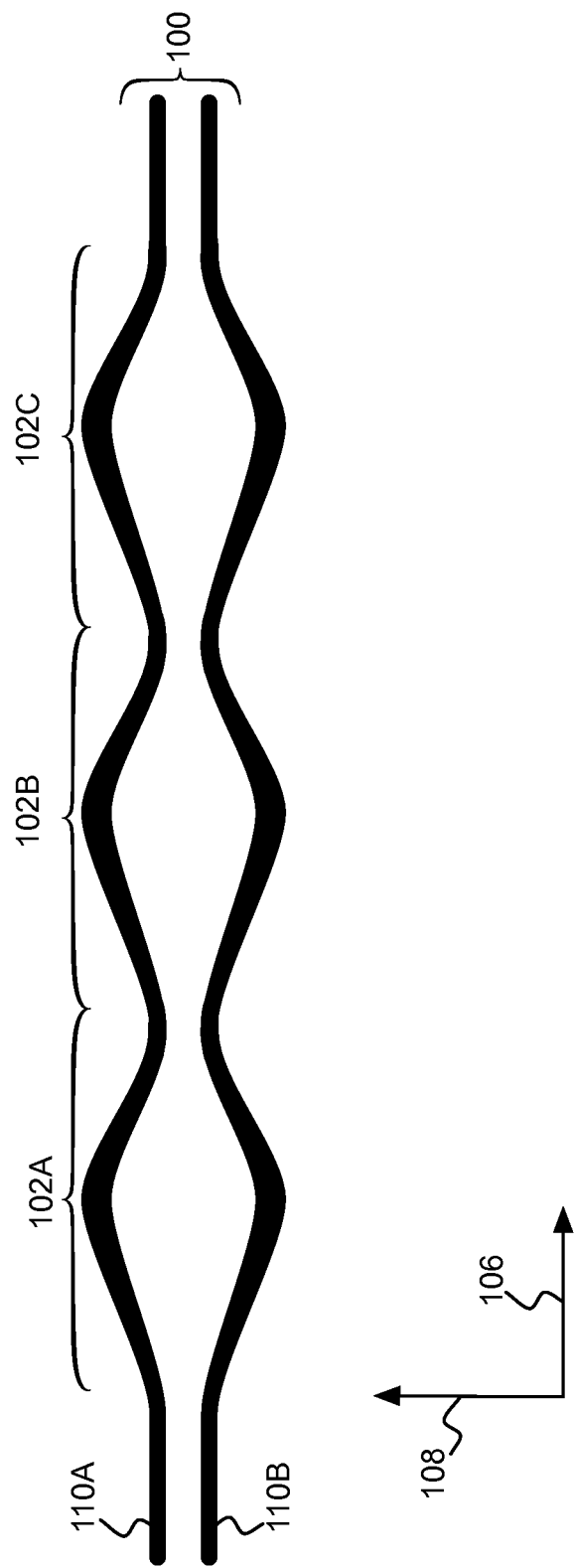

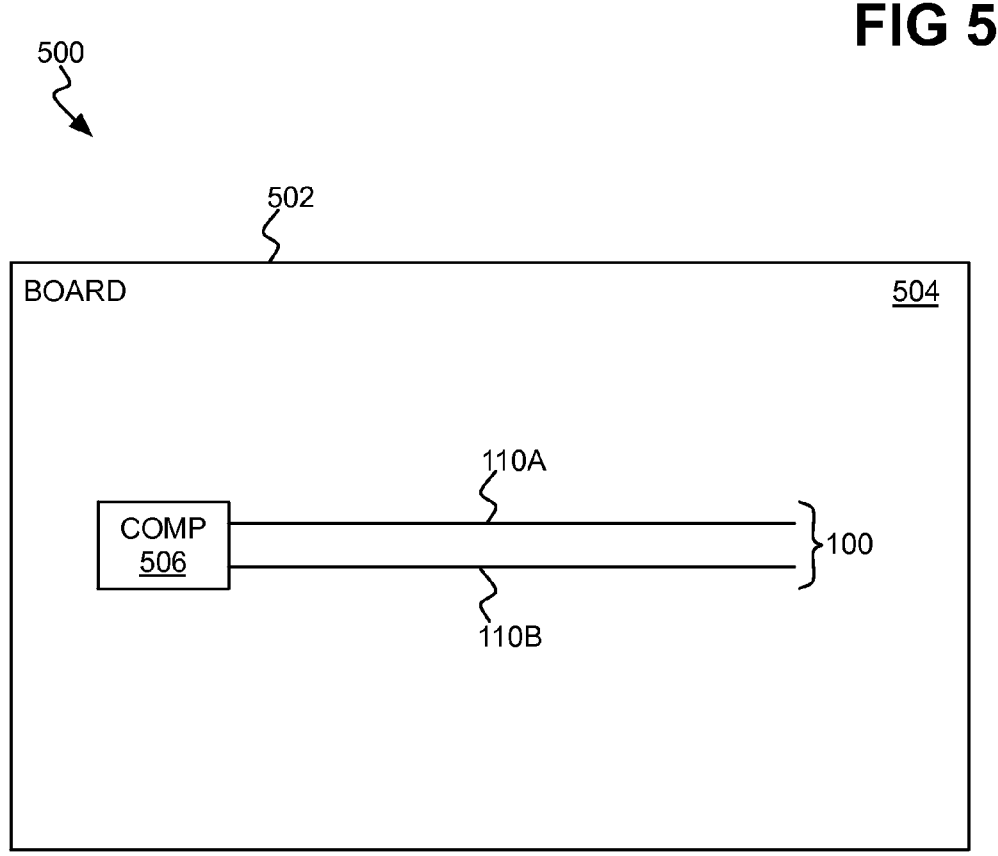

DIFFERENTIAL TRANSMISSION LINE WITH COMMON MODE NOTCH FILTER

BACKGROUND

Differential signaling is a way to transmit information electrically with two complementary signals sent over two paired conductors, which are referred to as a differential pair. External interference tends to affect both conductors, and information is sent as the difference between the two conductors. Therefore, differential signaling improves resistance to electromagnetic noise as compared with using just one conductor and an unpaired reference, such as ground.

SUMMARY

An example differential transmission line with a common mode notch filter includes adjacently arranged, repeating differential transmission line pair sections. The sections have lengths that are each equal to half of an electric wavelength of a lowest frequency of a common mode electromagnetic wave to be suppressed during transmission of an electric signal over the differential transmission line. Each section includes a pair of conductors separated from one another by a spacing. A width of each conductor and the spacing between the conductors of each section vary over the length thereof according to a same pattern such that at every point over the length of each section a differential mode impedance of the differential transmission line is identical. A common mode impedance of the differential transmission line changes periodically in accordance with the lengths of the sections.

An example circuit board includes a substrate and a differential transmission line on or within the substrate. The differential transmission line includes adjacently arranged, repeating differential transmission line pair sections. The sections have lengths that are each equal to half of an electric wavelength of a lowest frequency of a common mode electromagnetic wave to be suppressed during transmission of an electric signal over the differential transmission line. Each section includes a pair of conductors separated from one another by a spacing. A width of each conductor and the spacing between the conductors of each section vary over the length thereof according to a same pattern such that at every point over the length of each section a differential mode impedance of the differential transmission line is identical. A common mode impedance of the differential transmission line changes periodically in accordance with the lengths of the sections.

An example electronic device includes a circuit board having a differential transmission line, and one or more electrical components mounted on or within the circuit board. The differential transmission line includes adjacently arranged, repeating differential transmission line pair sections. The sections have lengths that are each equal to half of an electric wavelength of a lowest frequency of a common mode electromagnetic wave to be suppressed during transmission of an electric signal over the differential transmission line. Each section includes a pair of conductors separated from one another by a spacing. A width of each conductor and the spacing between the conductors of each section vary over the length thereof according to a same pattern such that at every point over the length of each section a differential mode impedance of the differential transmission line is identical. A common mode impedance of the differential transmission line changes periodically in accordance with the lengths of the sections.

BRIEF DESCRIPTION OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 1 is a diagram of an example differential transmission line having a common mode notch filter, in which the transmission line includes sections of equal length that each has two discrete sub-sections of unequal length.

FIG. 2 is a diagram of another example differential transmission line having a common mode notch filter, in which the transmission line includes sections of equal length that each has three discrete sub-sections of equal length.

FIG. 3 is a diagram of another example differential transmission line having a common mode notch filter, in which the transmission line includes sections of equal length, where in each of which conductor width and spacing varies continuously.

FIG. 5 is a diagram of an example electronic device having one or more electrical components and a circuit board with a differential transmission line having a common mode notch filter.

DETAILED DESCRIPTION

Figure 4A:
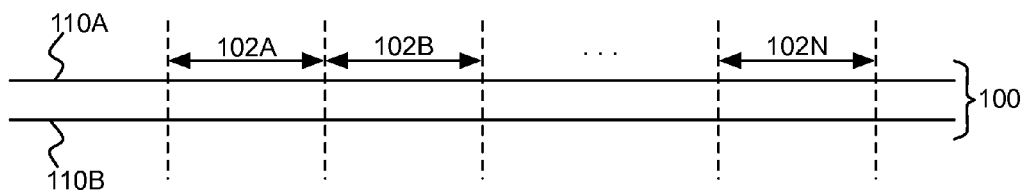
FIGS. 4A, 4B, and 4C are diagrams of different example profiles of transmission lines that can have a common mode notch filter.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, differential signaling employs a differential pair of conductors to improve resistance to electromagnetic noise, which is also known as the common mode signal. By comparison, the differential mode signal is the information conveyed as the difference between the conductors. However, in practice, high frequency alternating current (AC) components within the common mode signal cause electromagnetic radiation that result in noise even when employing differential signals.

Techniques disclosed herein further reduce such common mode noise within differential signaling, via employing a differential transmission line having a common mode notch filter. The transmission line includes adjacently arranged, repeating differential transmission line pair sections. The sections have lengths equal to half of an electric wavelength of a lowest frequency of a common mode electromagnetic wave to be suppressed during transmission of an electric signal over the differential transmission line. Each section includes a pair of conductors separated from one another by a spacing.

In each section, the width of each conductor and the spacing between the conductors vary over the length thereof according to a same pattern. At every point over the length of each section, the differential mode impedance of the differential transmission line is identical. However, the common mode impedance of the transmission line changes periodically, in accordance with the lengths of the sections. As such, the common mode signal at the selected wavelength is better suppressed.

FIG. 1 shows an example differential transmission line 100 that includes a common mode notch filter. The transmission line 100 includes adjacently arranged, repeating differential transmission line pair sections 102A, 102B, and 102C, which are collectively referred to as the sections 102. The sections 102 are adjacently arranged in that the first section 102A is adjacent to the middle section 102B, which is adjacent to the last section 102C. The sections 102 are repeating in that the section 102A has a pattern that is repeated in the section 102B and in the section 102C. In general, the more sections that are provided, the better the common mode signal suppression functionality is. That there are three sections 102 in the example of FIG. 1 is just for example purposes, in this respect.

The section 102A of the transmission line 100 is discussed herein as representative of each section 102. That is, the sections 102 are identical to one another structurally as to their constituent pattern. The section 102A has two sub-sections 104A and 104B, which are collectively referred to as the sub-sections 104. In general, there are at least two discrete sub-sections 104 or effectively an infinite number of continuous sub-sections 104, as described in more detail later in the detailed description.

The transmission line 100 is made up of a pair of conductors 110A and 110B, which are collectively referred to as the conductors 110. The length of each section 102 and of each sub-section 104 is measured along the mid-point of the sub-sections 104, which is along the axis 106 in the example of FIG. 1. The length of each section 102 includes the transition between adjacent sub-sections 102. For a desired common mode signal to be suppressed, the length of every section 102 is equal to half of the wavelength of this signal. The conductors 110 have widths measured along the axis 108, and are separated by a spacing measured along the same axis 108.

At any given point along the length of each section 102, the widths of the conductors 110 are identical, as is the spacing therebetween. However, the conductors 110 have widths within the sub-section 104A that are different than they have within the sub-section 104B, as well as a different spacing therebetween. That is, over the sub-section 104A, the conductors 110 have a given width and are separated by a given spacing that is different than the width and the spacing of the conductors 110 over the sub-section 104B. Stated another way, it can be said that the width of each conductor 110 and the spacing between the conductors 110 are differently constant in each sub-section 104 over the length of each section 102. The pattern of each section 102 is made up of the number of sub-sections 104, the length of each sub-section 104, and the conductor width and spacing in each sub-section 104.

The width and the spacing of the conductors 110 in each sub-section 104 are determined conventionally. For example, simulation computer programs such as those available from Cadence Design Systems, Inc., of San Jose, Calif. can be used. Conductor width and spacing are generally determined so that the differential mode impedance of the transmission line 100 is identical at every point along the length of each section 102, regardless of whether the point in question is within the sub-section 104A or the sub-section 104B. Further, conductor width and space are dependent on the conductive material of the conductors 110, the type of substrate on or in which they are formed, and whether the conductors 110 are formed on or within the substrate, among other factors, including the distance from reference ground planes, as can be appreciated by those skilled within the art.

By comparison, the common mode impedance of the transmission line 100 changes periodically, in accordance with the lengths of the sections. That is, when transitioning from one sub-section 104 within the same section 102 or to the next section 102, the common mode impedance changes. The result is a grated transmission line 100, where the grating effected by the conductor width and spacing changes from one sub-section 104 to the next forming the common mode notch filter of the line 100.

In the example of FIG. 1, the sub-sections 104 have different lengths. However, in another scenario, the sub-sections 104 have equal lengths. This latter scenario is particularly described in the previously filed and commonly assigned patent application entitled "EM suppression technique using a transmission line grating," filed on Dec. 17, 2013, and assigned application Ser. No. 14/109,440. Most generally, the sum of the lengths of the sub-sections 104 is equal to the length of each section 102.

The differing lengths of the sub-sections 104 change how the notch filtering functions at higher harmonics of the wavelength of the common mode signal to be suppressed. For example, some higher harmonic notch filtering can be reduced or even completely eliminated. The greater the number of the sections 102, the better the suppression of the common mode signal at this wavelength and its higher harmonics is. The length of the sections 102 can further be considered the period of the grating of the transmission line 100.

FIG. 2 shows another example differential transmission line 100 that includes a common mode notch filter, but that includes three sub-sections 104 (including sub-sections 104A, 104B, and 104C) of equal length instead of two sub-sections 104 of unequal length as in FIG. 1. However, like FIG. 1, the example transmission line 100 of FIG. 2 has a discrete pattern. The example of FIG. 2 thus serves to show that for a discretely patterned transmission line 100, the pattern can vary while still providing common mode notch filtering functionality. Reference numbers in FIG. 2 not described herein are as they have been described in FIG. 1.

In general, the number of such discrete sub-sections 104 can vary, so long as there are at least two sub-sections 104. Furthermore, in general, the number of sections 102 can vary, and there can be as few as one section 102. For a desired common mode signal to be suppressed, the length of every section 102, regardless of the number of sections 102, is equal to half of the wavelength of this signal. The sections 102 are further identically repetitive, in that each section 102 is identical to each other section 102 in the number and lengths of the constituent sub-sections 104 thereof.

FIG. 3 shows another example differential transmission line 100 that includes a common mode notch filter. Unlike the example transmission lines 100 of FIGS. 1 and 2, however, the example transmission line 100 of FIG. 3 has a continuous pattern. That is, within each section 102 in FIG. 3, there is not a number of discrete sub-sections 104 as there is in FIGS. 1 and 2. Rather, the width of each conductor 110 and the spacing between the conductors 110 vary continuously over the length of each section 102 according to a pattern. The pattern is said to be a "same pattern" in that the pattern by which the conductor width and spacing vary over the length of the section 102A is identical to that of the section 102B and that of the section 102C.

The width of each conductor 110 in each section 102 in FIG. 3 varies in accordance with a continuous function of the form $w(x)=f1$, where f1 is the function, w is the width of each conductor 110, and x is the distance along the axis 106, where x=0 corresponds to the start of each sub-section 102. Similarly, the spacing between the conductors 110 in each section varies in accordance with a continuous function of the form $s(x)=f2$, where f2 is the function, and s is the spacing between the conductors 110. As one example, the continuous functions f1 and f2 can be sinusoidal in nature.

For instance, the continuous function f1 may be specified as:

$$f1 = \frac{1}{2}(w_2 - w_1)\left(\sin\left(\frac{2\pi x}{L}\right) + 1\right) + w_1$$

In this equations, L is the length of each section 102, and $w_1$ and $w_2$ are the selected minimum and maximum widths, respectively, of each conductor 110. Based on this specified function f1 for w(x), the function f2 specifying s(x) is then determined using conventional approaches to achieve a desired constant differential impedance along the axis 106, such as by employing a simulation computer program as noted above. The continuous function form of a notch filter may be used to remove all higher harmonic notch filtering, at a desired frequency.

The continuous example of FIG. 3 can be considered as the cases of FIGS. 1 and 2 where there is an infinite number of sub-sections 104. Likewise, the discrete examples of FIGS. 1 and 2 can be considered as the case of FIG. 3 where the functions governing conductor width and spacing are discrete and not continuous functions. In this way, the transmission line 100 is similar across FIGS. 1, 2, and 3, and identical in that the line 100 has a common mode notch filter in each figure. The primary difference between the example of FIGS. 1 and 2 and that of FIG. 3 is in the former, the repeating pattern is discrete, whereas in the latter, the repeating pattern is continuous.

Figure 4B:
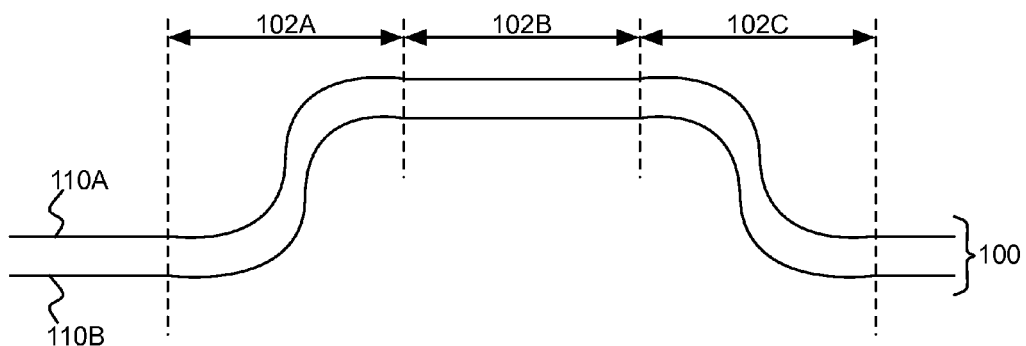
Figure 4C:
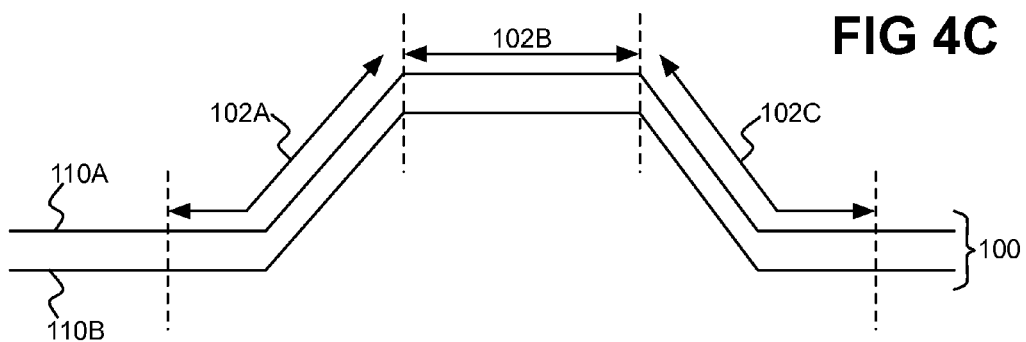

FIGS. 4A, 4B, and 4C show different example profiles of transmission lines that can have a common mode notch filter as has been described. For illustrative clarity and convenience, the varying nature of conductor width and spacing, either continuously or over discrete sections, is not depicted in FIGS. 4A, 4B, and 4C. In FIG. 4A, the sections 102, including sections 102A, 102B, . . . , 102N, of the transmission line 100 with the conductors 110 has a linear profile. That is, the sections 102 are each linear and parallel to one another. The example profile of FIG. 4A is what has been shown in and described in relation to FIGS. 1, 2, and 3.

In FIG. 4B, the sections 102, including sections 102A, 102B, and 102C, of the transmission line 100 with the conductors 110 has a curved profile. Generally, a curved profile means that at least one section 102 is curved. In the specific example of FIG. 4B, the sections 102A and 102C are curved. The length of each section 102 remains identical, however, as with a linear profile. The length of the curved sections 102A and 102C is measured from the beginning of each such section 102 to the end thereof, at the mid point between the conductors 110. At any given point within the curved sections 102A and 102C, conductor width and spacing are each measured along an axis perpendicular to a tangent line at that point.

In FIG. 4C, the sections 102, including sections 102A, 102B, and 102C, of the transmission line 100 with the conductors 110 has an angled profile. Generally, an angled profile means that at least one section 102 is non-parallel to one or more other sections 102. In the specific example of FIG. 4C, none of the sections 102 are parallel to any other section 102. The length of each section 102 remains identical. The length of each angled section 102 is measured from the beginning thereof to the end thereof, at the mid point between the conductors 110. At any given point within the angled sections 102, conductor width and spacing are each measured along an axis perpendicular to the section 102 at that point.

FIG. 5 shows a rudimentary example of an electronic device 500 that can include the differential transmission line 100 having a common mode notch filter as has been described. The device 500 includes at least a circuit board 502, such as a printed circuit board, as well as one or more electrical components 506. The circuit board 502 is made up of a single-layer or multiple-layer substrate 504, on or within which the conductors 110 of the transmission line 100 are formed. If the substrate 504 has just one layer, then the transmission line 100 may be formed thereon, whereas if it has multiple layers, then the line 100 may be formed on or within the substrate 504 (such as between two layers). The component 506 is mounted on the circuit board 502, and may be a resistor, capacitor, inductor, integrated circuit (IC), or another type of electrical component. As depicted in the example of FIG. 5, the component 506 is conductively connected to the transmission line 100, but does not have to be in other implementation.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A differential transmission line with a common mode notch filter, comprising:
a plurality of adjacently arranged, repeating differential transmission line pair sections, the sections having lengths that are each equal to half of an electric wavelength of a lowest frequency of a common mode electromagnetic wave to be suppressed during transmission of an electric signal over the differential transmission line, each section comprising a pair of conductors separated from one another by a spacing,
wherein a width of each conductor and the spacing between the conductors of each section vary over the length thereof according to a same pattern such that at every point over the length of each section a differential mode impedance of the differential transmission line is identical,
and wherein a common mode impedance of the differential transmission line changes periodically in accordance with the lengths of the sections.

2. The differential transmission line of claim 1, wherein the same pattern is a discrete pattern, such that each section comprises a plurality of sub-sections,
wherein the width of each conductor and the spacing between the conductors are differently constant in each sub-section over the length of each section.

3. The differential transmission line of claim 2, wherein the sub-sections of each section have different sub-section lengths.

4. The differential transmission line of claim 2, wherein the sub-sections of each section have identical sub-section lengths.

5. The differential transmission line of claim 2, wherein each section has exactly two sub-sections of different sub-section lengths.

6. The differential transmission line of claim 1, wherein the same pattern is a continuous pattern, such that the width of each conductor of each section varies according to a first continuous function and the spacing between the conductors of each section varies according to a second continuous function.

7. The differential transmission line of claim 6, wherein the first continuous function and the second continuous function are each sinusoidal.

8. The differential transmission line of claim 1, wherein a profile of the sections is linear, such that the sections are linear and parallel to one another.

9. The differential transmission line of claim 1, wherein a profile of the sections is angular, such that a plurality of sub-sections of at least one section includes a first sub-section and a second sub-section that are non-parallel to one another.

10. The differential transmission line of claim 1, wherein a profile of the sections is curved, such that at least one section is curved.

11. A circuit board comprising:
a substrate; and
a differential transmission line on or within the substrate and comprising:
a plurality of adjacently arranged, repeating differential transmission line pair sections, the sections having lengths that are each equal to half of an electric wavelength of a lowest frequency of a common mode electromagnetic wave to be suppressed during transmission of an electric signal over the differential transmission line, each section comprising a pair of conductors separated from one another by a spacing,
wherein a width of each conductor and the spacing between the conductors of each section vary over the length thereof according to a same pattern such that at every point over the length of each section a differential mode impedance of the differential transmission line is identical,
and wherein a common mode impedance of the differential transmission line changes periodically in accordance with the lengths of the sections.

12. The circuit board of claim 11, wherein the same pattern is a discrete pattern, such that each section comprises a plurality of sub-sections,
and wherein the width of each conductor and the spacing between the conductors are each differently constant in each sub-section over the length of each section.

13. The circuit board of claim 12, wherein each section has exactly two sub-sections of different sub-section lengths.

14. The circuit board of claim 11, wherein the same pattern is a continuous pattern, such that the width of each conductor of each section varies according to a first continuous function and the spacing between the conductors of each section varies according to a second continuous function.

15. The circuit board of claim 11, wherein a profile of the sections is one of:
linear, such that the sections are linear and parallel to one another;
angular, such that a plurality of sub-sections of at least one section includes a first sub-section and a second sub-section that are non-parallel to one another;
curved, such that at least one section is curved.

16. An electronic device comprising:
a circuit board having a differential transmission line comprising a plurality of adjacently arranged, repeating differential transmission line pair sections, the sections having lengths that are each equal to half of an electric wavelength of a lowest frequency of a common mode electromagnetic wave to be suppressed during transmission of an electric signal over the differential transmission line, each section comprising a pair of conductors separated from one another by a spacing; and
one or more electrical components mounted on or within the circuit board,
wherein a width of each conductor and the spacing between the conductors of each section vary over the length thereof according to a same pattern such that at every point over the length of each section a differential mode impedance of the differential transmission line is identical,
and wherein a common mode impedance of the differential transmission line changes periodically in accordance with the lengths of the sections.

17. The electronic device of claim 16, wherein the same pattern is a discrete pattern, such that each section comprises a plurality of sub-sections,
and wherein the width of each conductor and the spacing between the conductors are each differently constant in each sub-section over the length of each section.

18. The electronic device of claim 17, wherein each section has exactly two sub-sections of different sub-section lengths.

19. The electronic device of claim 16, wherein the same pattern is a continuous pattern, such that the width of each conductor of each section varies according to a first continuous function and the spacing between the conductors of each section varies according to a second continuous function.

20. The electronic device of claim 16, wherein a profile of the sections is one of:
linear, such that the sections are linear and parallel to one another;
angular, such that a plurality of sub-sections of at least one section includes a first sub-section and a second sub-section that are non-parallel to one another;
curved, such that at least one section is curved.

* * * * *